(12) United States Patent
Kudo et al.

(10) Patent No.: US 8,354,646 B2
(45) Date of Patent: Jan. 15, 2013

(54) SCINTILLATOR PLATE, SCINTILLATOR PANEL AND FLAT PANEL RADIATION DETECTOR BY USE THEREOF

(75) Inventors: Shinji Kudo, Tokyo (JP); Yasushi Nagata, Tokyo (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 13 days.

(21) Appl. No.: 12/446,154

(22) PCT Filed: Sep. 19, 2007

(86) PCT No.: PCT/JP2007/068149
§ 371 (c)(1),
(2), (4) Date: Apr. 17, 2009

(87) PCT Pub. No.: WO2008/053642
PCT Pub. Date: May 8, 2008

(65) Prior Publication Data
US 2010/0314547 A1 Dec. 16, 2010

(30) Foreign Application Priority Data
Oct. 30, 2006 (JP) .................................. 2006-293735

(51) Int. Cl.
*G01F 23/00* (2006.01)
*G01T 1/24* (2006.01)
(52) U.S. Cl. ................................. 250/370.1; 250/370.11
(58) Field of Classification Search .......................... None
See application file for complete search history.

(56) References Cited

U.S. PATENT DOCUMENTS

2006/0033031 A1* 2/2006 Takeda et al. ............ 250/370.11

FOREIGN PATENT DOCUMENTS

| JP | 5435060 | 10/1979 |
|----|---------|---------|
| JP | 01240887 | 9/1989 |
| JP | 5312961 | 11/1993 |
| JP | 6331749 | 12/1994 |
| JP | 721560 | 3/1995 |
| JP | 2000356679 | 12/2000 |
| JP | 2002116258 | 4/2002 |
| JP | 2003-262678 | 9/2003 |
| JP | 3566926 | 6/2004 |
| JP | 2004-325126 | 11/2004 |
| JP | 2006-052983 A | 2/2006 |
| WO | 02/23220 | 3/2002 |

OTHER PUBLICATIONS

Japanese Office Action, Notice of Reasons for Refusal, with English language Translation (total of 4 pages) Date mailed: Jan. 4, 2010.

* cited by examiner

*Primary Examiner* — David Porta
*Assistant Examiner* — Carolyn Igyarto
(74) *Attorney, Agent, or Firm* — Lucas & Mercanti, LLP (57) ABSTRACT

The scintillator plate has a reflective layer, a resinous anti-corrosion layer and a scintillator layer provided sequentially in that order on a heat resistant resin substrate. The scintillator plate is employed as a component for a flat panel radiation detector. The scintillator plate has a protective film between the scintillator layer and the flat light receiving element which makes up the flat panel radiation detector. There is point contact between the surface of the scintillator layer and the protective film and there is point contact between the flat light receiving element and the protective film.

15 Claims, 4 Drawing Sheets

SCINTILLATOR PLATE, SCINTILLATOR PANEL AND FLAT PANEL RADIATION DETECTOR BY USE THEREOF

This is a U.S. National Phase Application under 35 U.S.C. 371 of International Application PCT/JP2007/068149, filed on Sep. 19, 2007, which claims the priority of Japanese Application No. 2006-293735, filed Oct. 30, 2006, the entire content of both Applications are hereby incorporated by reference.

TECHNICAL FIELD

The present invention relates to a scintillator plate and a scintillator panel which are used in formation of a radiographic image of an object, and a flat panel radiation detector by use thereof.

TECHNICAL BACKGROUND

There have been broadly employed radiographic images such as X-ray images for diagnosis of the conditions of patients on the wards. Specifically, radiographic images using a intensifying-screen/film system have achieved enhancement of speed and image quality over its long history and are still used on the scene of medical treatment as an imaging system having high reliability and superior cost performance in combination. However, these image data are so-called analog image data, in which free image processing or instantaneous image transfer cannot be realized.

Recently, there appeared digital system radiographic image detection apparatuses, as typified by a computed radiography (also denoted simply as CR) and a flat panel detector (also denoted simply as FPD). In these apparatuses, digital radiographic images are obtained directly and can be displayed on an image display apparatus such as a cathode tube or liquid crystal panels, which renders it unnecessary to form images on photographic film. Accordingly, digital system radiographic image detection apparatuses have resulted in reduced necessities of image formation by a silver salt photographic system and leading to drastic improvement in convenience for diagnosis in hospitals or medical clinics.

The computed radiography (CR) as one of the digital technologies for radiographic imaging has been accepted mainly at medical sites. However, image sharpness is insufficient and spatial resolution is also insufficient, which have not yet reached the image quality level of the conventional screen/film system. Further, there appeared, as a digital X-ray imaging technology, an X-ray flat panel detector (FPD) using a thin film transistor (TFT), as described in, for example, the article "Amorphous Semiconductor Usher in Digital X-ray Imaging" described in Physics Today, November, 1997, page 24 and also in the article "Development of a High Resolution, Active Matrix, Flat-Panel Imager with Enhanced Fill Factor" described in SPIE, vol. 32, page 2 (1997).

To convert radiation to visible light is employed a scintillator panel made of an X-ray phosphor which is emissive for radiation. The use of a scintillator panel exhibiting enhanced emission efficiency is necessary for enhancement of the SN ratio in radiography at a relatively low dose. Generally, the emission efficiency of a scintillator panel depends of the phosphor layer thickness and X-ray absorbance of the phosphor. A thicker phosphor layer causes more scattering of emission within the phosphor layer, leading to deteriorated sharpness. Accordingly, necessary sharpness for desired image quality level necessarily determines the layer thickness.

Specifically, cesium iodide (CsI) exhibits a relatively high conversion rate of from X-rays to visible light. Further, a columnar crystal structure of the phosphor can readily be formed through vapor deposition and its light guide effect inhibits scattering of emitted light within the crystal, enabling an increase of the phosphor layer thickness.

However, the use of CsI alone results in reduced emission efficiency. For example, JP-B 54-35060 (hereinafter, the term JP-B refers to Japanese Patent Publication) disclosed a technique for use as an X-ray phosphor in which a mixture of CsI and sodium iodide (NaI) at any mixing ratio was deposited on a substrate to form sodium-activated cesium iodide (CsI:Na), which was further subjected to annealing as a post-treatment to achieve enhanced visible-conversion efficiency.

There were also proposed other means for enhancing light output, including, for example, a technique of rendering a substrate to form a scintillator thereon reflective, as described in patent document 1; a technique of forming a reflection layer on a substrate, as described in patent document 2; and a technique of a scintillator on a transparent organic film covering a reflective thin metal film provided on a substrate, as described in patent document 3. These techniques increased the light quantity but resulted in markedly deteriorated sharpness.

Techniques for placing a scintillator panel on the surface of a flat light-receiving element include, for example, those disclosed in JP-A Nos. 5-312961 and 6-331749. However, these are poor in production efficiency and cannot avoid deterioration in sharpness on a scintillator panel and a flat light-receiving surface.

Production of scintillator plates through a gas phase method were generally conducted by forming a scintillator layer on a rigid substrate such as aluminum or amorphous carbon and covering the entire surface of the scintillator layer with a protective layer, as described in, for example, patent document 4. However, formation of a scintillator layer on a substrate which cannot be freely bent is easily affected by deformation of the substrate or curvature at the time of vapor deposition when sticking a scintillator plate on the flat light-receiving element surface with paste, leading to defects such that uniform image quality characteristics cannot be achieved with the flat light-receiving surface of a flat panel detector. Further, a metal substrate exhibits a high X-ray absorption, producing problems, specifically when performing low exposure. In contrast, amorphous carbon which has been recently employed is useful in terms of low X-ray absorptivity but is difficult to be acceptable in practical production since no general-purpose one of a large size is available and its price is high. Accordingly, such problems have become serious along with the recent trend of increasingly larger flat panel detectors.

To avoid these problems was generally performed formation of a scintillator directly on the surface of a flat light-receiving element (i.e., on an imaging device) through vapor deposition or the use of a medical intensifying screen exhibiting flexibility but low sharpness instead of a scintillator plate. There was also disclosed the use of a soft protective layer such as poly-p-xylilene, as disclosed in, for example, patent document 5.

Although a scintillator material deposited directly on a flat light-receiving element exhibits enhanced image characteristics, such a scintillator material, however, has a cost defect such that a high-priced light-receiving element is wasted in occurrence of a defective product, and a heat treatment achieves enhancement of image characteristics of the scintillator material but a light-receiving element exhibits low heat resistance and is restricted in treatment temperature. There was also the problem of it being a cumbersome procedure such that it was necessary to include cooling the light-receiving element during thermal treatment.

Accordingly, there has been desired, to overcome the foregoing problems, development of a radiation flat panel detector which is superior in production suitability, inhibits deterioration of characteristics of a scintillator (or phosphor) layer during aging, protects the scintillator (or phosphor) layer from chemical deterioration or physical impact, results in little deteriorated sharpness in the scintillator plate and between flat light-receiving elements and results in uniform image quality characteristics.

Patent document 1: JP-B No. 7-21560
Patent document 2: JP-B No. 1-240887
Patent document 3: JP-A No. 2000-356679
Patent document 4: JP-B No. 3566926
Patent document 5: JP-A No. 2002-116258

DISCLOSURE OF THE INVENTION

Problems to be Solved

The present invention has come into being in view of the foregoing problems, therefore, it is an object of the present invention to provide a scintillator plate which is superior in productivity, exhibits enhanced light extraction efficiency of a scintillator and enhanced sharpness and results in reduced deterioration in sharpness between flat light-receiving element surfaces, a scintillator panel and a flat panel radiation detector by use thereof.

Means for Solving the Problems

The foregoing problems relating to the present invention can be overcome by the following constitution.
1. A scintillator plate comprising, on a heat-resistant resin substrate, a reflection layer, a resinous anticorrosion layer and a scintillator layer provided sequentially in this order, wherein the scintillator plate is employed, as a component for a flat panel radiation detector, without, being physicochemically adhered to the surface of a flat light-receiving element.
2. The scintillator plate as described in the foregoing 1, wherein the scintillator layer is a layer formed of a columnar phosphor comprising cesium iodide which was formed by a process of a gas phase deposition.
3. The scintillator plate as described in the foregoing 1 or 2, wherein the heat-resistant resin substrate is comprised of an engineering plastic or a super-engineering plastic.
4. The scintillator plate as described in any one of the foregoing 1 to 3, wherein the heat-resistant resin substrate is comprised of a polyimide or a resin containing a polyimide.
5. A scintillator panel comprising a scintillator plate as described in any one of the foregoing 1 to 4, wherein the scintillator plate is sealed with a first protective film disposed on the side of the scintillator layer and a second protective film disposed on the opposite side of the substrate and the first protective film is not adhered to the scintillator layer.
6. A flat panel radiation detector comprising a scintillator panel as described in the foregoing 5, wherein the scintillator panel is not physicochemically adhered to the surface of a flat light-receiving element.

Effect of the Invention

According to the foregoing means of the present invention, there can be provided a scintillator plate which is superior in productivity, exhibits enhanced light extraction efficiency of a scintillator and enhanced sharpness and results in reduced deterioration in sharpness in the pathway to a flat light-receiving element surface, a scintillator panel and a flat panel radiation detector by use thereof.

| DESCRIPTION OF NUMERAL DESIGNATIONS | |
|---|---|
| 1a-1c: | Scintillator panel |
| 101: | Scintillator plate |
| 101a, 3: | Substrate |
| 101b: | Scintillator layer (phosphor layer) |
| 101c: | Reflection layer |
| 101d: | Resinous anticorrosion layer |
| 102a, 104, 106: | First protective film |
| 102b: | Second protective film |
| 103a-103d, 105a, 105b, 107a-107c: | Sealing portion |
| 108: | Void portion (air layer) |
| E-H: | Point contact portion |
| R-T, X-Z: | Light |
| 2: | Vapor deposition apparatus |
| 201: | Vacuum vessel |
| 202: | Evaporation source |
| 203: | Substrate holder |
| 204: | Substrate rotation mechanism |
| 205: | Vacuum pump |

PREFERRED EMBODIMENTS OF THE INVENTION

A scintillator plate of the present invention is featured in that a scintillator plate comprises a heat-resistant resin substrate provided thereon with a reflection layer, a resinous anticorrosion layer and a scintillator layer in this order, and the scintillator plate, which is employed as a component of a radiation flat panel detector, is not physicochemically adhered to the surface of a flat light-receiving element. This feature is a common technical feature in the present invention as claimed in claims 1-6.

Herein, the scintillator layer refers to a phosphor layer containing a phosphor material. The expression "is not physicochemically adhered" means not being bonded through physical interaction, chemical reaction or the like by use of an adhesive agent.

There will further described constituent elements of the present invention.

Constitution of Scintillator Plate and Panel

The scintillator plate of the present invention comprises at least a reflection layer, a resin anticorrosion layer and a scintillator layer provided sequentially in this order on a heat resistant resin substrate. Further, a scintillator panel relating to the present invention is comprised of a scintillator plate provided with a protective layer. In the present invention, such protective layer preferably employs a protective film.

There will be described the individual component layers and component elements in the following.

Scintillator Layer

A material to form a scintillator layer (also denoted as a phosphor layer) may employ a variety of commonly known phosphor materials, of which cesium iodide (CsI) is preferred since it exhibits an enhanced conversion rate of X-rays to visible light and readily forms a columnar crystal structure of a phosphor, whereby scattering of emitted light within the crystal is inhibited through the light guide effect, rendering it feasible to increase the scintillator layer thickness.

CsI exhibits by itself a relatively low emission efficiency so that various activators are incorporated. For example, JP-B No. 54-35060 disclosed a mixture of CsI and sodium iodide (NaI) at any mixing ratio. Further, JP-A No. 2001-59899 disclosed vapor deposition of CsI containing an activator, such as thallium (Tl), europium (Eu), indium (In), lithium (Ii), potassium (K), rubidium (Ru) or sodium (Na). In the present invention, thallium (Tl) or europium (Eu) is preferred, of which thallium (Ti) is more preferred.

In the present invention, it is preferred to employ, as raw materials, an additive containing at least one thallium compound and cesium iodide. Thus, thallium-activated cesium iodide (denoted as CsI:Tl), which exhibits a broad emission wavelength of from 400 to 750 nm, is preferred.

There can be employed various thallium compounds (compound having an oxidation number of +I or +III) as a thallium compound contained in such an additive.

Preferred examples of thallium compounds include thallium bromide (TlBr), thallium chloride (TlCl), and thallium fluoride (TlF).

The melting point of a thallium compound relating to the present invention is preferably in the range of 400 to 700° C. A melting point more than 700° C. results in inhomogeneous inclusions of an additive within the columnar crystal. In the present invention, the melting point is one under ordinary temperature and ordinary pressure.

The molecular weight of a thallium compound is preferably in the range of from 206 to 300.

In the scintillator layer of the present invention, the content of an additive, as described above is desirably optimized in accordance with its object or performance but is preferably from 0.001 to 50.0 mol % of cesium iodide, and more preferably from 0.1 to 10.0 mol %.

An additive content of less than 0.001 mol % of cesium iodide results in an emission luminance which is almost identical level to the emission luminance obtained by cesium iodide alone. An additive content of more than 50 mol % makes it difficult to maintain the properties or functions of cesium iodide.

In the present invention, after forming a scintillator layer by vapor-deposition of scintillator materials on a polymer film, it is necessary to subject the formed scintillator layer to a thermal treatment in an atmosphere within a temperature range of from −50° C. to +20° C., based on the glass transition temperature of the polymer film over a period of 1 hr or more. Thereby, neither deformation of the film nor flaking of the phosphor occurs, whereby a scintillator panel of high emission efficiency can be realized.

Reflection Layer

A reflection layer relating to the present invention reflects light emitted from a scintillator to enhance a light extraction efficiency. The reflection layer is preferably formed of a material containing at least one element selected from Al, Ag, Cr, Cu, Ni, Ti, Mg, Rh, Pt, and Au. It is specifically preferred to use a metal thin-film formed of the foregoing elements, for example, Ag film and Al film. It is also preferred to form two or more metal thin-films.

Anticorrosion Layer

An anticorrosion layer is needed to be provided between the reflection layer and the scintillator layer to protect the reflection layer.

Such an anticorrosion layer preferably contains a polymeric binding material (or binder), a dispersing agent and the like.

The anticorrosion layer thickness is preferably from 0.5 to 2 µm. An anticorrosion layer thickness of not less than 3 µm results in increased light scattering within the anticorrosion layer, leading to deteriorated sharpness. An anticorrosion layer thickness of more than 2 µm gives rise to disorder of columnar crystallinity, caused by such a thermal treatment.

In the following, there will be described constituting elements of an anticorrosion layer.

Polymer Binding Material

An anticorrosion layer relating to the present invention is foiled preferably by coating a polymer binding material (hereinafter, also denoted simply as a binder) dissolved or dispersed in a solvent, followed by drying. Specific examples of a polymer binding material include a polyimide or a polyimide-containing, a polyurethane, a vinyl chloride copolymer, a vinyl chloride/vinyl acetate copolymer, a vinyl chloride/vinylidene chloride copolymer, a vinyl chloride/acrylonitrile copolymer, butadiene/acrylonitrile copolymer, a polyamide resin, polyvinyl butyral, a polyester, a cellulose derivative (e.g., nitrocellulose), a styrene-butadiene copolymer, various kinds of synthetic rubbers, a phenol resin, an epoxy resin, a urea resin, a melamine resin, a phenoxy resin, a silicone resin, an acryl resin and a urea-formamide resin. Of these, a polyurethane, polyester, a vinyl chloride copolymer, polyvinyl butyral and nitrocellulose are preferred.

A polyimide or a polyimide-containing resin, a polyurethane, a polyester, a vinyl chloride copolymer, a polyvinyl butyral, and a nitrocellulose are preferred as a polymer binder relating to the present invention, specifically in terms of adhesion to the scintillator layer. A polymer having a glass transition temperature (Tg) of 30 to 100° C. is also preferred in terms of adhesion of the deposited crystals to the substrate. In view of these, a polyester resin is specifically preferred. However, there are some cases in which a polymer having a Tg of 30 to 100° C. is difficult to ensure sufficient heat resistance when increasing a thermal treatment temperature to achieve enhancement of image characteristics such as luminance.

Specific examples of a solvent used for preparation of an anticorrosion layer include N,N-dimethylacetoamide, N-methyl-2-pyrrolidone, a lower alcohol such as methanol, ethanol, n-propanol or n-butanol, a chlorine-containing hydrocarbon such as methylene chloride or ethylene chloride, a ketone such as acetone, methyl ethyl ketone or methyl isobutyl ketone; an aromatic compound such as toluene or benzene or xylene, cyclohexane, cyclohexanone; an ester of a lower carboxylic acid and a lower alcohol such as methyl acetate, ethyl acetate or butyl acetate; dioxane, an ether such as ethylene glycol monoethyl ether or ethylene glycol monomethyl ether; and their mixtures.

The anticorrosion layer relating to the present invention may contain a pigment or a dye to prevent scattering of light emitted from the scintillator to achieve enhanced sharpness.

Protective Layer

A protective layer relating to the present invention is mainly intended to protect the scintillator layer. Specifically, since highly hygroscopic cesium iodide (CsI) easily absorbs moisture upon exposure to air, resulting in deliquescence, prevention thereof is the main aim of providing a protective layer. Such a protective layer can be formed using various materials.

In a scintillator panel relating to the present invention, a protective layer can be provided on the scintillator layer of the scintillator panel.

Further, one preferred embodiment of the present invention is that the scintillator panel is sealed with a first protective film disposed on the side of the foregoing scintillator layer on one side of the substrate and a second protective layer disposed on the outside (or the other side) of the substrate, and the first protective film is not physicochemically adhered to the scintillator layer.

Herein, the expression "is not physicochemically adhered" means not being bonded via a physical interaction or a chemical reaction by use of an adhesive agent, as afore-mentioned. Such a state of not being adhered may also refer to a state in which the surface of the scintillator layer and the protective film are optically or mechanically treated almost as a non-continuous body even if the scintillator surface is in point-contact with the protective film.

There will be described a protective film used in the present invention.

Constitution of a protective film used in the present invention include, for example, a multi-layered material having a constitution of a protective layer (which is an outermost layer)/interlayer (which is a moisture-proof layer)/innermost layer (which is a heat fusible layer). The individual layer may be multi-layered if needed.

Innermost Layer (Heat Fusible Layer)

A thermoplastic resin film as an innermost layer preferably employs EVA, PP, LDPE, LLDPE, LDPE produced by use of a metallocene catalyst, LLDPE and films obtained by mixed use of these films and HDPE film.

Interlayer (Moisture-Proof Layer)

Examples of an interlayer (moisture-proof layer) include a layer having an inorganic film, as described in JP-A No. 6-95302 and "Shinku (Vacuum) Handbook" Revised Edition, pp 132-134 (ULVC Nippon Shinku Gijutsu K.K.). Such an inorganic film includes, for example, a vapor-deposited metal film and a vapor-deposited inorganic material film.

Vapor-deposited metal films include, for example, ZrN, SiC, TiC, $Si_3N_4$, single crystal Si, ZrN, PSG, amorphous Si, W, and aluminum, and specifically preferred metal vapor-deposited film is aluminum.

Vapor-deposited inorganic material films include, for example, those described in "Hakumaku (Thin Film) Handbook" pp 879-901 (edited by Nippon Gakujutsu Shinkokai); and "Shinku (Vacuum) Handbook" Revised Edition, pp 132-134 (ULVC Nippon Shinku Gijutsu K.K.). Examples of inorganic material film include $Cr_2O_3$, $Si_xO_y$ (x=1, y=1.5-2.0), $Ta_2O_3$, ZrN, SiC, TiC, PSG, $Si_3N_4$, single crystal Si, amorphous Si, W, and $Al_2O_3$.

Resin film used as a base material of an interlayer (moisture-proof layer) may employ film materials used for packaging film of ethylene tetrafluoroethylene copolymer ETFE), high density polyethylene (HDPE), oriented polypropylene (OPP), polystyrene (PS), polymethyl methacrylate (PWA), biaxially oriented nylon 6, polyethylene terephthalate (PET), polycarbonate (PC), polyimide, polyether styrene (PES) and the like.

Vapor-deposit film can be prepared by commonly known methods, as described in "Shinku (Vacuum) Handbook" and Hoso Gijutsu, Vol. 29, No. 8, for example, a resistance heating or high-frequency induction heating method, an electron beam (EB) method, and plasma (PCVD). The thickness of deposit film is preferably from 20 to 400 nm, and more preferably from 50 to 180 nm.

Outermost Layer

Resin film used over deposited film may employ polymer films used as packaging film of low density polyethylene (LDPE), HDPE, linear low density polyethylene (LLDPE), medium density polyethylene, casting polypropylene (CPP), OPP, oriented nylon (ONy), PET, cellophane, polyvinyl alcohol (PVA), oriented vinylon (OV), ethylene-vinyl acetate copolymer (EVOH), polyvinylidene chloride (PVDC), and a polymer of a fluorinated olefin (fluoroolefin) or a copolymer of fluorinated olefins.

Such resin film may optionally employ a multi-layer film made by co-extrusion of different kinds of films or a multi-layer film, made by lamination with varying the orientation angle. Further, there may be combined film density, molecular weight distribution and the like to achieve physical properties needed for a packaging material. A thermoplastic resin film of the innermost layer employs LDPE, LLDPE, LDPE made by use of a metallocene catalyst, LLDPE, and a film made by mixed use of these films and HDPE film.

In the case of using no inorganic material-deposited film, a protective layer is required to function as an interlayer. In that case, single or plural thermoplastic films used for the protective layer may be superimposed. There may be employed, for example, CPP/OPP, PET/OPP/LDRE, Ny/OPP/LDPE, CPP/OPP/EVOH, Saran UB/LLDPE (in which Saran UB is biaxially oriented film made from vinylidene chloride/acrylic acid ester copolymer resin, produced by Asahi Kasei Kogyo Co., Ltd.), K-OP/PP, K-PET/LLDPE, K-Ny/EVA (in which "K" denotes a vinylidene chloride resin-coated film).

These protective films can be prepared by commonly known methods, for example, a wet lamination method, a dry lamination method, a hot melt lamination method, an extrusion lamination method, and a heat lamination method. When using no inorganic material-deposited film, these methods are applicable. Further, there are also applicable a multi-layer inflation system and co-extrusion molding system, depending on the materials to be used.

There are usable commonly known adhesives for lamination. Examples of such adhesives include heat-soluble thermoplastic polyolefin resin adhesives such as various kinds of polyethylene resins and polypropylene resins; heat-meltable thermoplastic resin adhesives such as ethylene copolymer resin (e.g., ethylene-propylene copolymer, ethylene-vinyl acetate copolymer, ethylene-ethyl acrylate copolymer), ethylene-acrylic acid copolymer resin and ionomer resin; and heat-meltable rubber adhesives. Examples of an emulsion or latex adhesive include emulsions of a polyvinyl acetate resin, a vinyl acetate-ethylene copolymer resin, a vinyl acetate-acrylic acid ester copolymer resin, a vinyl acetate-maleic acid ester copolymer, an acrylic acid copolymer and ethylene-acrylic acid copolymer. Typical examples of a latex type adhesive include natural rubber, styrene butadiene rubber (SBR), acrylonitrile butadiene rubber (NOR) and chloroprene rubber (CR). Adhesives used for dry lamination include an isocyanate adhesive, a urethane adhesive and polyester adhesive. There are also usable a hot melt lamination adhesive obtained by blending paraffin wax, microcrystalline wax, an ethylene-vinyl acetate copolymer resin and an ethylene-ethyl acrylate copolymer resin; a pressure-sensitive adhesive and heat-sensitive adhesive. Specific examples of a polyolefin resin adhesive used for extrusion lamination include a copolymer of ethylene and other monomers (α-olefin) such as L-LDPE resin, an ionomer resin (ionic copolymer resin) Serlin (produced by Du Pont Co.) and high Milan (produced by Mitsui Kagaku Co., Ltd.) as well as polymeric materials composed of a polyolefin resin such as polyethylene resin, polypropylene resin or polybutylene resin, and an ethylene copolymer resin (e.g., EVA, EEA). Recently, there was also used a UV-curable adhesive. Specifically, an LDPE resin and an L-LDPE resin are low in price and exhibit superior lamination altitude. A mixed resin obtained by mixing at least two of the foregoing resins to compensate drawbacks of the individual resin is specifically preferred. For instance, blending L-LDPE resin and LDPE resin results in enhanced wettability and reduced neck-in, leading to an enhanced laminating speed and reduced pin-holes.

Taking into account protective property, image sharpness, moisture-proof and workability of a scintillator layer (phosphor layer), the thickness of a protective film is preferably from 12 to 500 μm and regarding the first protective layer provided on the side of a scintillator layer, which greatly affects image quality, its thickness is preferably not less than 20 μm and not more than 70 μm. Further, taking into account image sharpness, radiation image uniformity, production stability and workability, the haze ratio of the first protective film is preferably not less than 3% and not more than 40%, and more preferably not less than 3% and not more than 10%. The haze ratio represents a value measured, for example, by NDH 5000W of Nippon Denshoku Kogyo Co., Ltd. A targeted haze ratio can be achieved by making a choice from commercially available polymer films.

Taking into account photoelectric conversion efficiency and the scintillator emission wavelength, the light transmittance of the first protective film is preferably not less than 70% at 550 nm, and no film exhibiting a light transmittance of more than 99% is industrially available so that a transmittance of 70 to 99% is substantially preferred.

Taking into account protectivity and deliquescence of the scintillator layer, the moisture permeability of a protective film (which is measured based on JIS 20208) is preferably not more than 50 g/m$^2$·day(40° C. 90% RH) and more preferably not more than 10 g/m$^2$·day(40° C. 90% RH). Since no film having a moisture permeability of not more than 0.01 g/m$^2$·day(40° C. 90% RH) is industrially available, the moisture permeability preferably is substantially not less than 0.01 g/m$^2$·day(40° C. 90% RH) and not more than 50 g/m$^2$·day (40° C. 90% RH) and not more than 50 g/m$^2$·day(40° C. 90% RH), and more preferably not less than 0.1 g/m$^2$·day(40° C. 90% RH) and not more than 10 g/m$^2$·day(40° C. 90% RH).

Further, in another embodiment of a protective layer, an organic thin layer, for example, a poly(p-xylilene) film as a protective layer is formed on the entire surface of a scintillator layer and the substrate.

Substrate

The substrate relating to the present invention features a heat-resistant resin substrate. Such a heat-resistant resin substrate may employ commonly known resins but an engineering plastic is preferably employed. A engineering plastic refers to a highly functional plastic for industrial use (engineering use), which generally exhibits advantages such that it is high in strength and heat resistance, and superior in chemical resistance.

Engineering plastics relating to the present invention are not specifically limited, and including, for example, a polysulfone resin, a polyethersulfone resin, a polyimide resin, polyetherimide resin, a polyamide resin, a polyacetal resin, a polycarbonate resin, a polyethylene terephthalate resin, an aromatic polyester resin, a modified polyphenylene oxide resin, a polyphenylenesulfide resin, and a polyether ketone resin. These engineering plastics may be used singly or in combinations of two or more.

Further, depending of a hardening temperature is preferred the use of a super engineering plastic, as typified by a polyether ether ketone (PEEK) or polytetrafluoroethylene (PTFE).

In the present invention, it is also preferred to form a substrate with a polyimide such as a polyimide resin or a polyetherimide resin which is superior in heat resistance, machinability, mechanical strength and cost.

In view of the fact that adhering a scintillator panel onto the surface of a flat light-receiving element is affected by deformation of a substrate or its warping during vapor deposition, whereby a uniform image quality characteristic cannot be achieved within the light-receiving surface of a flat panel detector, the use of a substrate having a thickness of not less than 50 μm and not more than 500 μm renders it feasible to transform the scintillator panel to the form fitted to the shape of the flat light-receiving element surface, whereby uniform sharpness is achieved over all the light-receiving surface of the flat panel detector.

Production of Scintillator Plate and Panel

There will be further described the embodiments of the present invention with reference to FIGS. 1 to 4, but the present invention is by no means limited.

Figure 1:
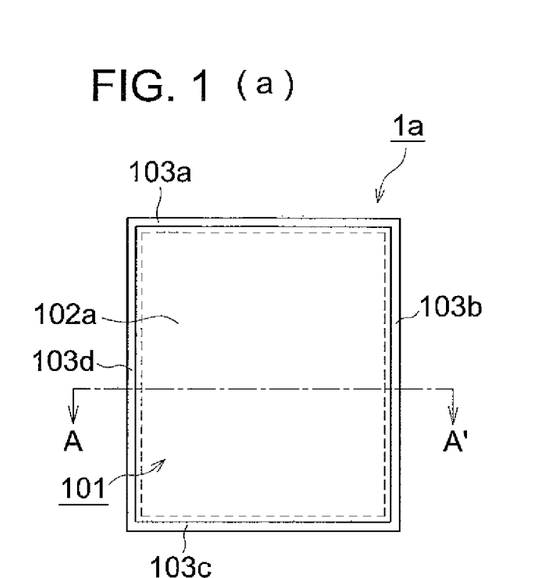
FIG. 1 illustrates a plan view of a scintillator panel.

FIG. 1 illustrates a flat view of a scintillator panel. FIG. 1(a) illustrates a flat view of a scintillator panel in which a scintillator plate is sealed with a protective film by four sealed edges. FIG. 1(b) illustrates a flat view of a scintillator panel. FIG. 1(c) illustrates a flat view of a scintillator panel which is sealed with a protective film by three sealed edges.

First, there will be described a scintillator panel of FIG. 1(a). In FIG. 1(a), numeral 1a designates a scintillator panel. The scintillator panel 1a is provided with a scintillator plate 101, a first protective film 102a disposed on the side of a scintillator layer 101b (FIG. 2) of the scintillator plate 101 and a second protective film 102b (FIG. 2) disposed on the side of a substrate 101a of the scintillator plate 101. 103a-103d designate four sealing sections of the first protective film 102a to the second protective film 102b and the sealing sections 103a-103d are each formed on the outside of the circumference of the scintillator plate 101. The four sealed edges refer to the state of having sealing portions on the four edge sections. As illustrated in this figure, the form of four sealed edges can be made by sandwiching a scintillator plate between two sheets of planar protective film and sealing four edges. In that case, this first protective film 102a and the second protective film 102b (see, FIG. 2) may be different or identical and can be optimally chosen depending on needs.

There will be described a scintillator panel of FIG. 1(b). In this figure, numeral 1b designates a scintillator panel. The scintillator panel 1b is provided with the scintillator plate 101, a first protective film 104 disposed on the side of the scintillator layer 101b (FIG. 2) of the scintillator plate 101 and a second protective film (not shown in the figure) disposed on the side of the substrate 101a of the scintillator plate 101. Numerals 105a and 105b designate two sealing portions between the first protective film 104 and the second protective film (not shown in the figure) and the sealing portions 105a and 105b are each formed on the outside of the periphery of the scintillator plate 101. The two sealed edges refer to the state having sealing portions on two edge sections. As illustrated in the figure, the two edge seal can be formed by sandwiching a scintillator plate between cylindrical protective films formed by the inflation method and sealing the two edges. In that case, a protective film used for the first protective film 104 and one used for the second protective film (not shown in the figure) are identical.

There will be described a scintillator panel of FIG. 1(c). In this figure, numeral 1c designates a scintillator panel. The scintillator panel 1c is provided with the scintillator plate 101, a first protective film 106 disposed on the side of the scintillator layer 101b (FIG. 2) of the scintillator plate 101 and a second protective film (not shown in the figure) disposed on the side of the substrate 101a of the scintillator plate 101. Numerals 107a-105c designate three sealing portions between the first protective film 104 and the second protective film (not shown in the figure) and the sealed portions 107a-107b are each formed on the outside of the periphery of the scintillator plate 101. The three sealed edges refer to the state of having sealing portions on three edge sections. As illustrated in the figure, the two edge seal can be formed by folding a sheet of protective film in the middle, sandwiching a scintillator plate between the thus formed two protective film sheets and sealing three edges. In that case, protective films used for the first protective film 106 and the second protective film (not shown in the figure) are identical. As shown in FIG. 1(a)-FIG. 1(c), the sealing portion between two sheets of the first protective film and the second protective film is outside the periphery of the scintillator plate, which renders it feasible to inhibit entrance of moisture from the outer periphery. The scintillator layer of a scintillator plate, as illustrated in FIGS. 1(a)-1(c) is formed on a substrate preferably by gas phase deposition. The process of gas phase deposition can be performed by a vapor deposition method, sputtering method, a CVD method, an ion plating method and the like.

The form of scintillator panels, as shown in FIGS. 1(a) to 1(c) can be chosen depending on the kind of a scintillator layer of a scintillator plate and a manufacturing apparatus.

Figure 2:
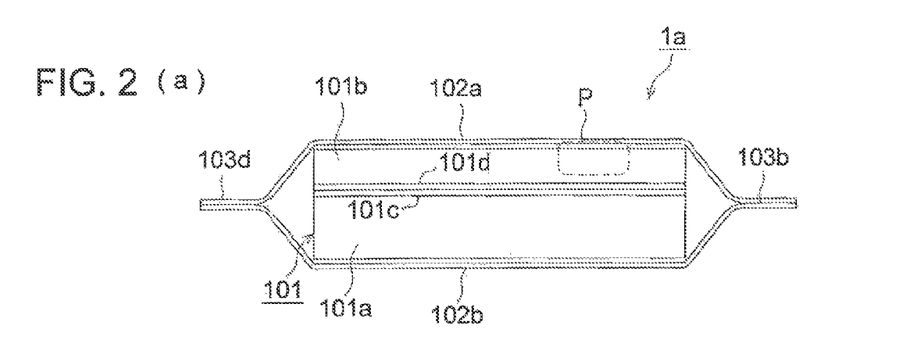
FIG. 2 illustrate a sectional view along line A-A' of FIG. 1(a).

FIG. 2 illustrate the section along A-A' of FIG. 1(a) and the contact state with a planar light-receiving element. FIG. 2(a) illustrates an enlarged view of the section along A-A' of FIG. 1(a) and the state of being in contact with a planar light-receiving element. FIG. 2(b) illustrates an enlarge view of the portion designated by P in FIG. 1(a).

The scintillator plate 101 is provided with a substrate 101a and a scintillator layer formed on the substrate 101a. Numeral 102b designates a second protective film disposed on the side of a substrate 101a of the scintillator plate 101. Numeral 108 designates an air gap (air space) formed between point-contact portions E-H in which the first protective film 102a and the scintillator layer 101b are in partial contact with each other. The air gap (air space) 108 forms air space and the relationship between a refractive index of the air gap (air space) 108 and that of the first protective film 102a is:

refractive index of first protective film 102a>>refractive index of air gap (air space) 108.

In FIG. 2(c), numeral 109 designates an air gap (air space) formed between point-contact portions J-O in which the first protective film 102a and a planar light-receiving element 201' are partially in contact with each other. The air gap (air space) 109 forms air space and the relationship between a refractive index of the air gap (air space) 109 and that of the first protective film 102a is:

refractive index of first protective film 102a>>refractive index of air gap (air space) 109.

Even in the case of scintillator panels illustrated in FIG. 1(b) and FIG. 1(c), the relationship between the refractive index of the air gap (air space) 108 or 109 and that of the first protective film 102a is the same as the case of the figure.

Thus, the first protective film 102a disposed on the side of the scintillator layer 101b is not in total contact with the scintillator layer 101b but is in partial contact at portions E to H. When covering the total surface of the scintillator layer 101b with the first protective film 102a disposed on the side of the scintillator layer 101b, the number of the point-contact portions E to H is preferably from not less than 0.1 portion/mm² and not more than 25 portion/mm² per surface area of the scintillator layer 101b. In the present invention, such a state means one in which the first protective film disposed on the side of the scintillator layer is substantially not in contact. In the case of a scintillator panel as shown in FIGS. 1(b) and 1(c), the relationship of the number of point-contact portions with the surface area of a scintillator layer is the same as shown in the figure.

In FIG. 2(c), the first protective film 102a is not in total contact with the surface of a planar light-receiving element 201' but only in partial contact at point-contact portions J-O, The number of point-contact portions J-O is preferably from not less than 0.1 portion/mm² and not more than 25 portion/mm² of the surface area of the planar light-receiving element 201'. The number of point-contact portions of the first protective film 102a with the scintillator layer 101b and the number of point-contact portions of the first protective film 102a with the planar light-receiving element 201' being each more than 25 portion/mm² is one of the causes of deteriorated sharpness. The number at point-contact portions at less than 0.1 portion/mm² results in one of causes of deteriorated luminance and image sharpness.

Measurement of the number of point-contact portions can be conducted in the manner described below.

A scintillator panel is exposed to X-rays and the emitted light is read by a planar light-receiving element using a CMOS or a CCD to obtain data of signal values. The obtained data are subjected to Fourier transform to obtain power spectrum data every spatial frequency. The number of point-contact portions can then be known from peak positions of the power spectrum. Thus, a contact point portion of the protective layer and a non-contact portion cause minute differences in luminance and the number of point-contact portions can be determined by measurement of its cycle.

However, this method detects the total sum of the number of point-contact portions of the first protective layer 102a and the scintillator layer 101b and the number of point-contact portions of the first protective film 102a and the planar light-receiving element 201'. To separate the number of individual point-contacts, for example, there may be applied a technique in which the first protective film 102a and the scintillator layer 101b are totally adhered by an adhesive to determine only the number of contact points of the first protective film 102a with the planar light-receiving element 201'.

As shown in the figures, in the scintillator panel 1a, the scintillator plate 101 is covered with the first protective film 102a disposed on the side of the scintillator layer 101b of the scintillator plate 101 and the second protective film 102b is disposed on the side of the substrate 101a in such a manner that the total surface of the scintillator layer 101b is substantially not adhered, and the respective end portions of four edges of the first protective film 102a and the second protective film 102b are sealed.

Methods for coverage in such a form that the entire surface of the scintillator layer 101b is covered without being substantially adhered include the following ones.

(1) The surface roughness of the surface first protective film in contact with a scintillator layer is made to be from 0.05 μm to 0.8 μm in terms of Ra, taking into account close contact with the first protective film, sharpness and close contact of the planar light-receiving element. The surface form of the first protective film can be readily controlled by selecting the resin film to be used or by coating a film containing an inorganic material onto the resin film surface. The surface roughness (Ra) refers to a value measured by SURFCOM 1400D, produced by Tokyo Seimitsu Co., ltd.

(2) Sealing of a scintillator plate with the first protective film and the second protective film is conducted under a reduced pressure condition of 5 Pa to 8000 Pa, in which sealing in a high vacuum side results in an increased number of contact points between the protective film and the scintillator layer and sealing in a low vacuum side results in the decreased number of contact points. Further, a pressure of more than 8000 Pa, which tends to cause wrinkling on the protective film surface, is not practical.

Application of the foregoing methods 1) and 2) singly or in combination enables coverage of the entire surface of the scintillator layer 101b with the first protective film 102a, while substantially not being adhered.

The state of the first protective film 102a not being substantially adhered to a planar light-receiving element can be achieved by the following method:

(1) After the scintillator panel 1a is superimposed onto the planar light-receiving element, optimum pressure is applied from the second protective film side by employing elasticity of a foamed material such as a sponge. The foregoing (1) can result in a state that the first protective film 102a is not substantially adhered to the planar light-receiving element.

Taking into account formability of an air gaps, protection of the scintillator layer, sharpness, moisture proofing, workability and the like, the thickness of a protective film is preferably not less than 12 and not more than 200 μm, and more preferably not less than 20 μm and not more than 40 μm. The thickness indicates an average value obtained by measurement of ten portions by using a contact type film thickness meter (PG-01), produced by Techlock Co.

Taking into account sharpness, radiographic image uniformity, production stability and workability, the haze ratio is preferably not less than 3% and not more than 40%, and more preferably not less than 3% and not more than 10%. The haze ratio is a value measured by NDH 5000W, produced by Nippon Denshoku Kogyo Cp., Ltd.

Taking into account photoelectric conversion efficiency and emission wavelength of the scintillator, the light transmittance of a protective film is preferably not less than 70% at 550 nm, but since a film of light transmittance of more than 99% is not industrially available, 99% to 70% is substantially preferred. The light transmittance is a value determined by a spectrophotometer (U-1800, produced by Hitachi High-Technologies Inc.).

Taking into account protection and deliquescence of the scintillator layer, the moisture permeability of a protective film is preferably not more than 50 g/m$^2$·day (40° C.·90% RH) and more preferably not more than 10 g/m$^2$·day (40° C.·90% RH), which is determined in accordance with JIS 20208.

As shown in the drawing, sealing the scintillator plate 101 with the first protective film 102a and the second protective film 102b may be performed by any known method. To perform effective sealing via heat welding by using an impulse sealer, for example, it is preferred to use a thermally fusible resin film for the protective film 102a and the innermost layer in contact with the protective film 102b.

Figure 3:
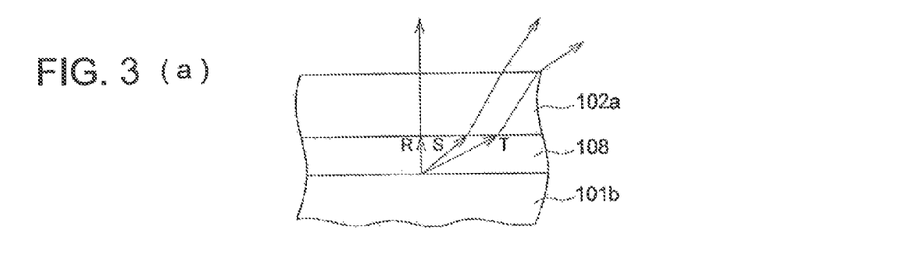
FIG. 3 illustrates light refraction in, the void portion illustrated in FIG. 2 and also illustrates light refraction in the state of a conventional protective film being in contact with a scintillator layer (phosphor layer).

FIG. 3 illustrate the state of light refraction within the air gap shown in FIG. 2(b) and the state of light refraction when a conventional protective film is in close contact with a scintillator layer. FIG. 3(a) illustrates light refraction in the air gap 108, as shown in FIG. 2(a). FIG. 3(b) illustrates light refraction in the state when a conventional protective film is in close contact with a scintillator layer.

First, there will be described the case of FIG. 3(a).

As shown in this figure, a air gap 108 (airspace) is present between a protective film and a scintillator layer the refractive index of a first protective film 102a and that of the air gap 108 (airspace) satisfy the relationship:

refractive index of a first protective film>>refractive index of the air gap (airspace).

Accordingly, lights R-T emitted on the surface of the scintillator layer enter the inside of the protective film without being reflected on the interface between the first protective film 102a and the air gap (airspace) 108 (in a state having no critical angle). The thus entered light is externally emitted through an optical contrast structure of airspace (low refractive layer)/protective film/airspace without being reflected again in the interface between the protective film and the airgap, rendering it feasible to prevent deterioration of image sharpness.

Next, there will be described the case of FIG. 3(b).

In the case shown in the figure, since a protective film and a scintillator layer are in contact with each other, of lights X-Z emitted from the phosphor surface, light Z of an angle exceeding the critical angle θ exhibits an increased ratio of being totally reflected at the interface through an optical contrast structure of protective layer/airspace, which has been shown to be one of causes for deteriorated image sharpness.

In the present invention, when a scintillator plate is sealed with a first protective film and a second protective film, as shown in FIG. 3(a), a scintillator layer and the first protective film are placed substantially without being adhered therebetween, and a protective layer and a planar light-receiving element are also placed substantially without being adhered therebetween, which renders it feasible to produce a scintillator plate without deteriorating sharpness.

It was further proved that a 50-500 μm thick polymer film substrate and a total scintillator panel thickness of not more than 1 mm render it feasible to change the form of the scintillator panel to fit the shape of the planar light-receiving element, permitting uniform sharpness over the entire light-receiving surface of a flat panel detector, whereby the present invention has come into being.

In the present invention, as shown in FIGS. 1-3, when a scintillator plate was sealed with a first protective film and a second protective film, the first protective film covering the scintillator layer was placed substantially without being adhered, that is, contact points are provided between the scintillator layer and the first protective film, forming air gaps (airspaces) between the contact points, whereby the following advantageous effects were achieved.

(1) The use of films of polypropylene, polyethylene terephthalate, polyethylene naphthalate and the like, which were previously difficult for use as a protective film since essential film strength was superior as a physical property for the protective film but a high refractive index resulted in a lowering of sharpness, has now become easy, rendering it feasible to produce a scintillator panel of enhanced quality and inhibited lowering of performance over a long duration.

(2) The use of a protective film of enhanced resistance to flawing has become feasible, and realizing a scintillator panel of superior durability over a long duration.

(3) There has become realizable a protective layer exhibiting enhanced durability without inhibiting the light guide effect of a phosphor crystal.

Figure 4:
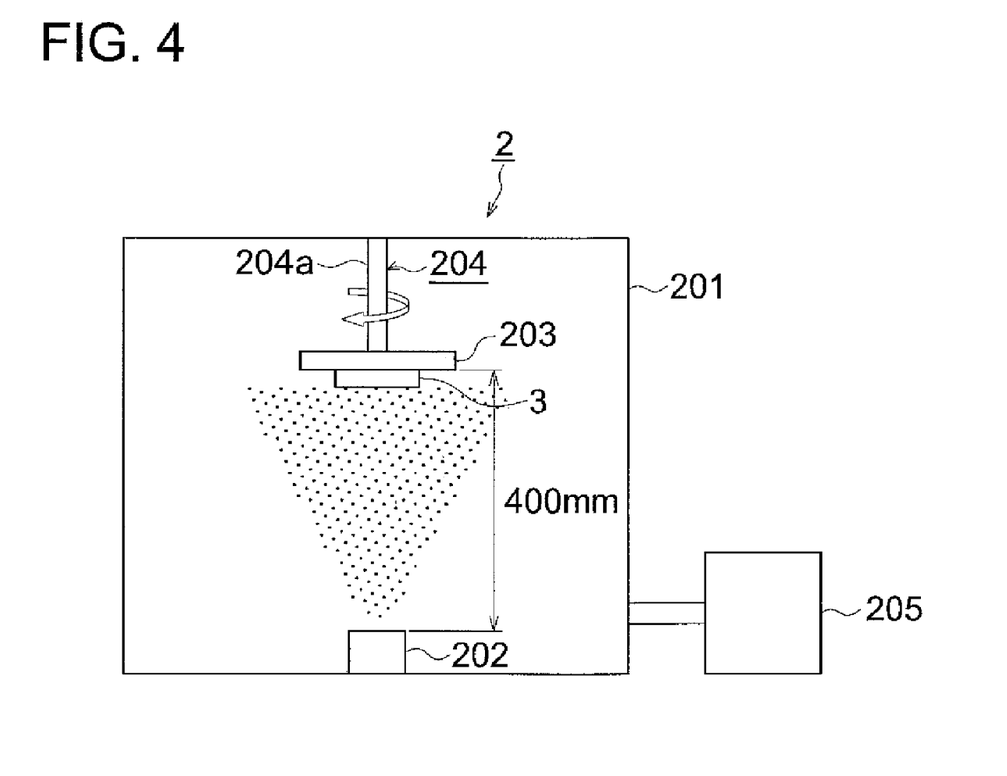
FIG. 4 illustrates a vapor deposition apparatus to form a scintillator layer on a substrate by the process of vapor deposition.

FIG. 4 illustrates a vapor deposition apparatus to form a scintillator layer via vapor deposition.

In FIG. 4, numeral 2 designates an evaporation apparatus. The evaporation apparatus is provided with a vacuum vessel 201, an evaporation source 202 which is installed within the vacuum vessel and deposits vapor onto a substrate 3, a substrate holder 203 to hold the substrate 3, a substrate rotation mechanism 204 to deposit the vapor evaporated from the evaporation source 202 onto the substrate with rotating the substrate holder 203 and a vacuum pump to perform evacuation within the vacuum vessel 201 and introduction of atmosphere.

The evaporation source 202, which houses a scintillator layer forming material and performs heating via resistance heating, may be constituted of an aluminum crucible rounded by a heated, a boat or a heater composed of a high-melting metal. Techniques for heating the scintillator layer forming material include ion beam heating and high-frequency induction heating as well as electrical resistance heating, but resistance heating is preferred in terms of relatively simple constitution, low price and applicability to various materials. The evaporation source 202 may be a molecular beam source employing a molecular beam epitaxial technique.

The substrate rotation mechanism 204 is constituted of, for example, a rotation shaft 204a to rotate the substrate holder 204 with supporting the substrate holder 203 and a motor (which is not designated in this drawing) disposed outside the vacuum vessel 201 and serving as a driving source.

The substrate holder 203 is preferably provided with a heater (not designated in this drawing) to heat the substrate 3. Heating of the substrate 3 performs release/removal of adsorbates on the surface of the substrate 3, preventing generation of an impurity layer between the surface of the substrate 3 and a scintillator layer forming material, enhancing closer contact and controlling quality of the scintillator layer.

Further, there may be provided a shutter (not designated in this drawing) to cutoff the space from the evaporation source 202 to the substrate 3. Non-objective materials adhered onto the surface of a scintillator layer forming material are evaporated through the shutter at the initial stage of evaporation, preventing deposition onto the substrate 3.

To form a scintillator layer on the substrate 3 by using the evaporation apparatus 2, first, the substrate 3 is fitted onto the substrate holder 203, then, the interior of the vacuum vessel is evacuated. Thereafter, the substrate holder is rotated toward the evaporation source 202 through the substrate rotation mechanism 204. When the vacuum vessel 201 reaches a degree of vacuum capable of performing vapor deposition, a scintillator layer forming material is evaporated from the heated evaporation source 202 to allow a phosphor to grow to an intended thickness on the surface of the substrate 3. In that case, the distance between the substrate 3 and the evaporation source 202 is preferably from 100 to 1500 mm. The scintillator layer forming material to be used as an evaporation source may be fabricated in tablet form by pressure compression or may be in the form of powder. In place of a scintillator layer forming material, there may be used its raw material or a mixture thereof.

Radiation Flat Panel Detector

Figure 5:
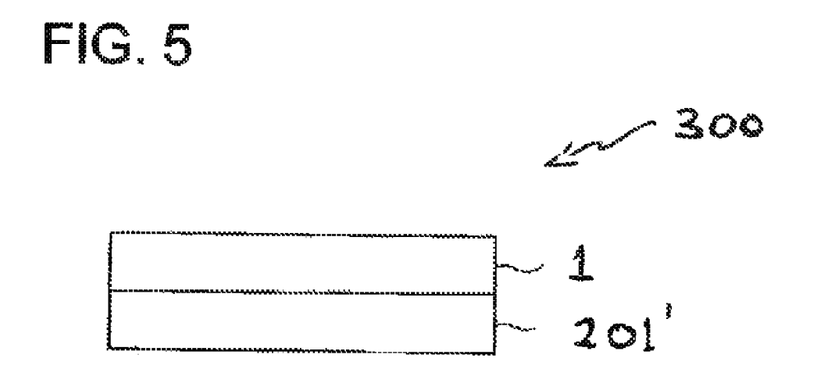
FIG. 5 illustrates a flat panel radiation detector having a scintillator plate on a flat light receiving element.

A radiation flat panel detector 300 relation to the present invention is capable of digitizing image data by converting emission from a scintillator panel 1 to electric charges on the surface of a planar light-receiving element 201'.

In a direct deposition type (integral type), deposition is performed directly onto the surface of a planar light-receiving element to form an integrated scintillator formed of a planar light-receiving element and a scintillator layer. On the contrary, an indirect deposition type (separated independent type) of the present invention is constituted of a scintillator panel placed on the surface of a planar light-receiving element, which is featured in that the scintillator panel is not physicochemically adhered to the surface of the flat light-receiving element.

EXAMPLES

The present invention will be described with reference to examples but is not limited to these.

Example 1

Preparation of Scintillator Plate

Substrate:
A 0.125 mm thick polyimide film of 90 mm×90 mm (also denoted simply as PI) and a 0.5 mm thick aluminum plate were prepared as a substrate.
Formation of Reflection Layer
A 2000 Å thick reflection layer was formed by sputtering aluminum onto the one side of the polyimide (PI) substrate.
Formation of Anticorrosion Resin Layer
Anticorrosion Resin Layer A:

| | |
|---|---|
| Biron 630 (polyester resin, Produced by TOYOBO CO., Ltd.) | 100 parts by mass |
| Methyl ethyl ketone (MEK) | 100 parts by mass |
| Toluene | 100 parts by mass |

The foregoing components were mixed and dispersed by a beads mill for 15 hrs. to obtain a coating solution for subbing. The obtained coating solution was coated on the foregoing substrate by a bar coater to form a dry thickness of 1.0 μm and dried at 100° C. for 8 hrs to prepare a subbing layer.
Anticorrosion Resin Layer B (Polyimide):
Aromatic polyimide varnish SKYBOND 700, produced by IST Co., Ltd was coated on the reflection layer and dried to form a layer at a dry thickness of 1.5 μm. After being dried in a drying machine at 120° C. for 1 hr. to remove coating solvents, a heat treatment was conducted at 250° C. for 2 hrs. to perform curing.
Formation of Scintillator Layer
Using an evaporation apparatus, as shown in FIG. 4, a phosphor (CsI:0.003 Tl) was deposited on the prepared substrate to form a scintillator layer, whereby a scintillator plate was obtained.
Specifically, a raw material of a phosphor (CsI:0.003 Tl) was placed into a resistance-heating crucible, a substrate was placed on a substrate holder and the distance between the resistance-heating crucible and the substrate was adjusted to 400 mm. Subsequently, the interior of the evacuation apparatus was evacuated and after controlling a degree of vacuum to 0.5 Pa with introducing Ar gas, the temperature of the substrate was held at 140° C., while rotating the substrate. Subsequently, the resistance-heating crucible was heated to evaporate the phosphor and evaporation was completed when a scintillator layer reached a thickness of 600 μm, whereby a scintillator was obtained.
Annealing of Scintillator Plate
The obtained scintillator plate was subjected to annealing in an inert oven under a nitrogen atmosphere at 250° C. over 3 hrs.
Preparation of Protective Film
There was employed, a barrier film with a laminated layer, Barrier Rock (with a coat) 1011HG^CW (#12), produced by TORAY Kako Co., Ltd., as a protective film of the scintillator layer side.

A protective film of the substrate side of a scintillator sheet employed the same one as the protective film of the scintillator layer side.

Scintillator Panel

A scintillator panel, which was sealed in the form shown in FIG. 1(c), was made by using the thus prepared scintillator plate and protective film.

Sealing was performed by conducting thermal welding at a 1 mm distance from the welded portion to the circumference of the scintillator sheet. An impulse sealer used for welding employed a 3 mm wide heater.

Evaluation

The thus obtained samples were each set to a 10 cm×10 cm CMOS flat panel (X-ray CMOS camera system Shad-o-Box 4K EV, produced by Rad-icon Imaging Corp.) and evaluation was made from output data at 12 bits.

Sponges were disposed on the side of a carbon plate of a radiation entrance window and also on the radiation entrance side of a scintillator plate (the side having no phosphor), whereby a planar light-receiving element and a scintillator panel were lightly pressed to be fixed.

Measurement of Relative Luminance

Samples were each set to a 10 cm×10 cm CMOS flat panel (X-ray CMOS camera system Shad-o-Box 4K EV, produced by Rad-icon Imaging Corp.) and the back side of each sample (i.e., the side having no phosphor scintillator layer) was exposed to X-rays at a tube voltage of 80 kVp and a measured value of instantaneous emission was defined as luminance (sensitivity). Measurement results are shown in Table 1. In Table 1, luminance was represented by a relative value, based on the luminance of Sample 1 being 1.00.

Moisture-Proof Test

Samples were incubated over seven days in a humidifying cycle, such as being heated at 20° C. for 5.5 hrs., followed by the temperature being raised for 0.5 hr., followed by being heated at 30° C. and 80% RH for 5 hrs., followed by the temperature being lowered for 1 hr. and followed by being heated at 20° C., whereby there was determined the deterioration rate of sharpness (MTF), as defined below. The evaluation method of sharpness will be described later.

Deterioration rate of sharpness={1−[(sharpness after being incubated)/(initial sharpness)]}×100%

Samples were evaluated based on the deterioration rate of sharpness, as below:
A: 0-5%,
B: 5-20%,
C: 21-30%,
D: more than 30%.

Sharpness (MTF)

The back side of each sample (i.e., the substrate side having no phosphor scintillator layer) was exposed through a lead MTF chart to X-rays at a tube voltage of 80 kVp, and image data were detected by a CMOS flat panel installed with a scintillator and recorded on a hard disc. Then, the record on the hard disc was analyzed by a computer and the modulated transfer function MTF (a MTF value at spatial frequency 1 cycle/mm) of an X-ray image recorded on the hard disc was defined as a measure of sharpness. A higher MTF value indicates superior sharpness. Herein, MTF is the abbreviation of Modulation Transfer Function.

Evaluation Rank of MTF:
A: An MTF value at spatial frequency 1 cycle/mm being not less than 0.7 and less than 0.9,
B: An MTF value at spatial frequency 1 cycle/mm being not less than 0.6 and less than 0.7,
A: An MTF value at spatial frequency 1 cycle/mm being less than 0.6

The foregoing evaluation results are shown in Table 1.

TABLE 1

| Sample No. | Substrate | Reflection Layer | Anticorrosion Resin Layer | After-treatment | Luminance | MTF | Moisture Proof | Remark 1 | Remark 2 |
| --- | --- | --- | --- | --- | --- | --- | --- | --- | --- |
| 1 | Al | *1 | — | — | — | — | — | *5 | Comp. |
| 2 | Al | *1 | A | *3 | 1 | A | A | — | Comp. |
| 3 | PI | — | — | *3 | 0.55 | A | A | — | Comp. |
| 4 | PI | *2 | — | *3 | 1.17 | A | D | — | Comp. |
| 5 | PI | *2 | A | *3 | 1.15 | A | A | — | Inv. |
| 6 | PI | *2 | B | *4 | 1.25 | A | A | — | Inv. |

*1: Aluminum substrate itself
*2: Aluminum-sputtered layer
*3: Under an atmosphere of nitrogen at 250° C. for 3 hr.
*4: Under an atmosphere of nitrogen at 350° C. for 3 hr.
*5: Deposit layer fell away due to insufficient adhesion between a substrate and a scintillator layer As is apparent from the results shown in Table 1, it was proved that the sample relating to the present invention was superior in luminance, sharpness and moisture proof.

What is claimed is:

1. A scintillator plate comprising:
a. heat-resistant resin substrate;
reflection layer on the heat-resistant resin substrate;
a resinous anticorrosion layer on the reflective layer; and
a scintillator layer on the resinous anticorrosion layer,
wherein the scintillator plate is to be employed as a component for a flat panel radiation detector in which a protective film is between the scintillator plate and a surface of a flat light-receiving element and there are a plurality of point contact portions and an air gap between the scintillator layer and the protective film and a plurality of point contact portions and an air gap between the surface of the flat light-receiving element and the protective film.

2. The scintillator plate as claimed in claim 1, wherein the scintillator layer is a columnar phosphor layer comprising cesium iodide which was formed by a process of a gas phase deposition.

3. The scintillator plate as claimed in claim 1, wherein the heat-resistant resin substrate is comprised of an engineering plastic.

4. The scintillator plate as claimed in claim 1, wherein the heat-resistant resin substrate is comprised of a polyimide or a resin containing a polyimide.

5. A scintillator panel comprising:
a scintillator plate, wherein the scintillator comprises a heat-resistant resin substrate having thereon a reflection, layer, a resinous anticorrosion layer and, a scintillator layer provided sequentially in that order;

a first protective film disposed on a side of the scintillator layer of the scintillator plate, the first protective film having a plurality of point contact portions and an air gap with the scintillator layer; and a second protective film disposed on a side of the substrate of the scintillator plate, such that the scintillator plate is sealed by the first protective film and the second protective film.

6. A flat panel radiation detector comprising:

a scintillator panel wherein the scintillator panel comprises a scintillator plate comprising a heat-resistant resin substrate having thereon a reflection layer, a resinous anticorrosion layer and a scintillator layer provided sequentially in that order and the scintillator plate is sealed with a first protective film disposed on a side of the scintillator layer and a second protective film disposed on a side of the substrate; and a flat light-receiving element, wherein the first protective film is between the scintillator panel and the surface of the flat light-receiving element and there are a plurality of point contact portions and an air gap between the scintillator layer and the protective film and a plurality of point contact portions and an air gap between the surface of the flat light-receiving element and first protective film.

7. The scintillator panel as claimed in claim 5, wherein the scintillator layer is a columnar phosphor layer comprising cesium iodide which was formed by a process of a gas phase deposition.

8. The scintillator panel as claimed in claim 5, wherein the heat-resistant resin substrate is comprised of an engineering plastic or a super-engineering plastic.

9. The scintillator panel as claimed in claim 5, wherein the heat-resistant resin substrate is comprised of a polyimide or a resin containing a polyimide.

10. The flat panel radiation detector as claimed in claim 6, wherein the scintillator layer is a columnar phosphor layer comprising cesium iodide which was formed by a process of a gas phase deposition.

11. The flat panel radiation detector as claimed in claim 6, wherein the heat-resistant resin substrate is comprised of an engineering plastic.

12. The flat panel radiation detector as claimed in claim 6, wherein the heat-resistant resin substrate is comprised of a polyimide or a resin containing a polyimide.

13. The scintillator plate as claimed in claim 1 wherein the point contact portions between the scintillator layer and the protective film is not less than 0.1 portion/mm$^2$ and not more than 25 portion/mm$^2$; and the point contact portions between the surface of the flat light-receiving element and the protective film is not less than 0.1 portion/mm$^2$ and not more than 25 portion/mm$^2$.

14. The scintillator panel as claimed in claim 5, wherein the point contact portions between the scintillator layer and the first protective film is not less than 0.1 portion/mm$^2$ and not more than 25 portion/mm$^2$.

15. The flat panel radiation detector as claimed in claim 6, wherein the point contact portions between the scintillator layer and the first protective film is not less than 0.1 portion/mm$^2$ and not more than 25 portion/mm$^2$; and the point contact portions between the surface of the flat light-receiving element and the first protective film is not less than 0.1 portion/mm$^2$ and not more than 25 portion/mm$^2$.

* * * * *